United States Patent Office 3,409,802
Patented Nov. 5, 1968

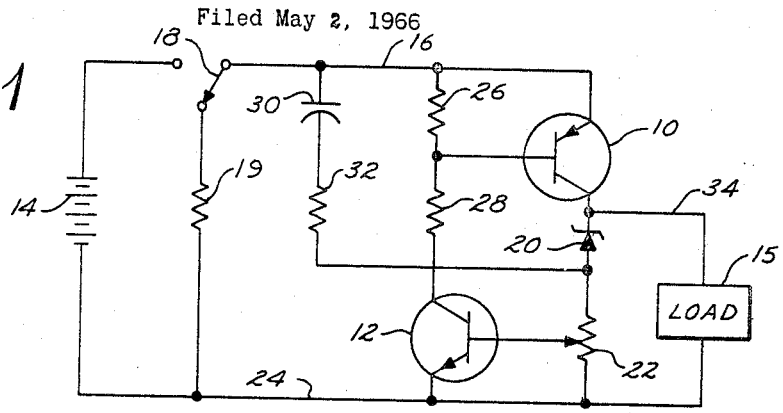
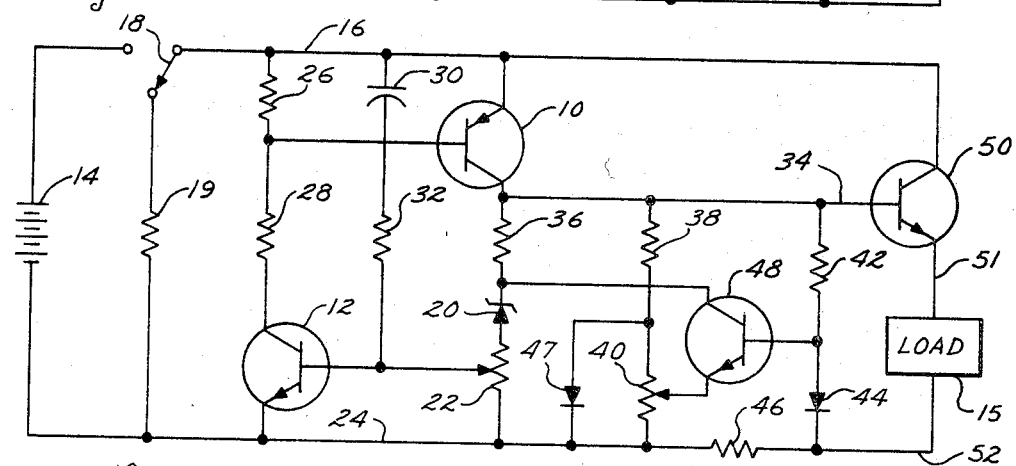
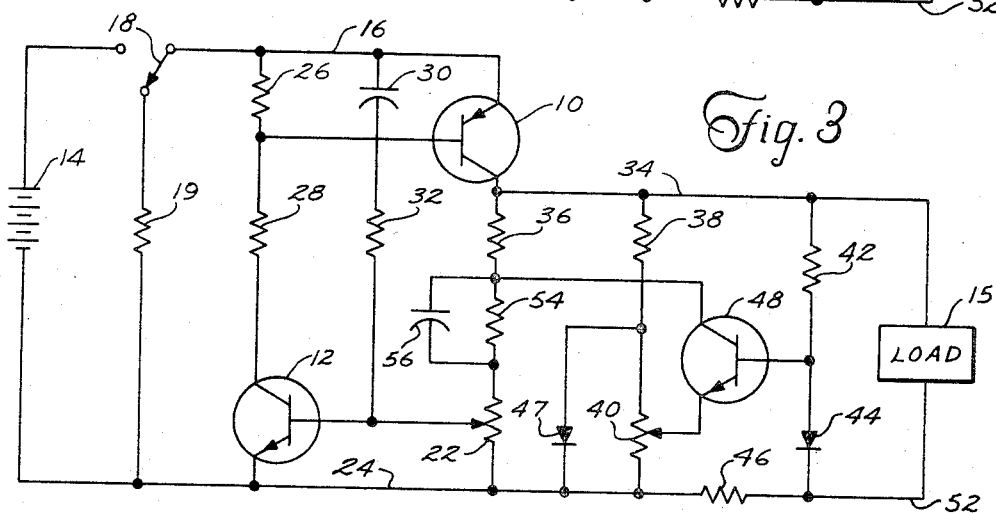

3,409,802
UNDERVOLTAGE AND OVERCURRENT BATTERY PROTECTIONS CIRCUIT
John W. Savage, Bethesda, Md., assignor to The Susquehanna Corporation, a corporation of Delaware
Filed May 2, 1966, Ser. No. 546,833
10 Claims. (Cl. 317—31)

ABSTRACT OF THE DISCLOSURE

An embodiment of this battery-protection circuit includes two transistors which are connected regeneratively to function as a fast-acting switch. An RC path is provided to turn the switch on so that current flows through this switch to the load. A Zener diode, which functions as a voltage level sensor, is connected in the base circuit of one of the transistors. If the input drops to the Zener voltage either because of a drop in battery voltage or because of a short circuit across the load, the current to the base of this latter transistor is insufficient to support saturation and the switch regeneratively turns off, terminating all current flow from the battery.

---

This invention relates to a circuit for controlling the output from a battery or other DC source. More particularly, this invention relates to a circuit for protecting a battery and its load by terminating all current flow from the battery when the battery voltage has dropped to a predetermined level or when the battery current is so excessive that it indicates a shorted condition exists in the battery load.

Batteries are used to power many electrical and electronic devices, such as radios, tape recorders, portable toothbrushes, shoe polishers, portable tools, and test equipment. These batteries are often of the rechargeable variety, an economy which permits the use of the same battery for a much longer period of time than would be the case if the battery could not be recharged. Many battery-operated devices require a voltage greater than that available from a single-cell battery, and so several cells are placed in series to provide a higher voltage. Rechargeable batteries having several cells, such as nickel-cadmium batteries, are utilized to power many devices. As such a battery discharges, the different cells usually do not reach complete discharge at the same time. This is due to differences in cell capacity, often aggravated by repeated charge-discharge cycles.

While a single rechargeable battery cell can be totally discharged and then recharged satisfactorily, it has been found that if one cell in a multi-cell battery becomes totally discharged while other cells in the battery still retain some charge, continued operation will cause the discharged cell to attain a charge of opposite polarity to its original. This reverse charge can permanently damage the cell. To guard against such damage, it is preferable that current flow from the battery be completely terminated when the battery voltage has dropped to a predetermined value. For example, for conservative operation such a value would be that which is less than the total battery full-charge voltage by an amount equal to the full-charge voltage of one cell. Thus, if a battery has ten cells, each with a full-charge voltage of 1.3 volts, then the battery full-charge voltages is 13 volts. A drop in this battery voltage to 11.7 volts may indicate that one cell has completely discharged and is likely to attain a reverse charge. Thus, all current flow from the battery should be terminated when the battery voltage reaches 11.7 volts.

A low voltage condition can also result in damage to battery-operated equipment. For example, a switching transistor may drop out of saturation due to a drop in its base current caused by a decreased supply voltage. As a consequence, the voltage drop across the transistor emitter-collector circuit will increase, while the current through the transistor remains substantially constant. The resulting increase in power dissipation in the transistor will cause heating, which could damage the transistor. As a further example, tape recorders frequently include sensors which detect when the end of a reel of tape has been reached and which then stop the tape to prevent its being pulled completely off the reel. If such a tape recorder is operated from too low a battery voltage, the recorder may record or play back, marginally if not satisfactorily, but the end-of-tape sensors may not operate. As a consequence, the tape may be pulled completely off its reel, resulting in permanent damage to the recorder or to the tape, and resulting in loss of recorded information.

Devices are now known which are capable of monitoring and indicating the voltage level or charge condition of batteries. Some existing devices indicate the weakened battery condition but permit the battery to continue to provide current to whatever load is attached to it. Such devices do not protect the battery or its load. Other existing devices cut off current to the load when the battery low-voltage condition is detected, but continue to provide battery current to the monitoring circuit itself. While this protects the load, even this slight current can cause a reverse charge on a battery cell, thereby permanently damaging the battery. There is thus a need for a device which will provide positive battery protection and equipment protection by fully terminating the discharge from the battery once a preselected low voltage has been reached.

In addition, both batteries and battery-operated equipment can be permanently damaged if a short-circuit in the equipment causes a high current to be drawn from the battery. It is desirable to be able to sense such a high current from the battery and to rapidly terminate the battery output when such a condition exists. Again, many current-regulating circuits are presently known, but these only attempt to lower the current when a dangerous condition exists; they do not fully terminate it. While a fuse might provide the needed protection, fuses are relatively slow acting, and so, by the time a fuse has opened the circuit, damage may have already occurred to the battery or to the load equipment. Consequently, there is also a great need for a device which will provide positive protection to both the battery and its load by rapidly terminating all the current drawn from the battery when that current becomes so excessive that it is indicative of a shorted condition in the load. Such a device must operate very rapidly, because damage either to the battery or to the load equipment can take place in a very short time.

It is therefore an object of the present invention to provide an improved battery protection circuit.

It is another object of the present invention to provide a circuit which can sense the voltage level of a battery and which will terminate all the current drawn from the battery when this voltage has dropped to a pre-set level.

A further object of the present invention is to provide a circuit capable of protecting battery-operated equipment and batteries from damage due to excessive current.

A further object is to provide an improved battery protection circuit capable of rapidly terminating all current flow from a battery when either a low voltage level or a high current is sensed.

These and other objects and advantages of the subject invention will become obvious from the following description and claims, when considered in conjunction with the accompanying drawings, in which like parts bear like numerals. In the drawings:

FIGURE 1 is a schematic diagram of a first embodiment of the subject invention capable of protecting batteries and battery-operated equipment from damage due to low-voltage levels.

FIGURE 2 is a schematic diagram of a second embodiment of the subject invention capable of protecting batteries and battery-operated equipment from damage due to either low voltage levels or high current drain.

FIGURE 3 is a schematic diagram of a third embodiment of the invention capable of preventing damage to batteries or battery-operated equipment due to either low voltage levels or high current drain.

Briefly, the subject invention, in one embodiment, comprises a fast-acting switch with a first current path which is operative to turn on the switch, but inoperative thereafter, and with a voltage sensing means, capable of turning the switch off when a predetermined low-voltage level has been reached. In other embodiments, a current sensing means is added to turn off the switch when an excessive current is drawn.

FIGURE 1 depicts an embodiment of the invention capable of terminating current flow from a battery when the battery voltage becomes too low. A PNP transistor 10 and an NPN transistor 12 are connected as a fast-acting switch between a multi-cell battery 14 and a load 15. The emitter of transistor 10 is connected by input line 16 to the arm of a single-pole, double-throw switch 18, which may be the control switch of the load 15. The first terminal of SPDT switch 18 is connected to the positive side of the battery 14, and the other terminal is connected through resistor 19 to the negative side of battery 14. The collector of transistor 10 connects to a voltage sensing means, shown as the series combination of Zener diode 20 and the fixed resistance of potentiometer 22. Zener diode 20 has its cathode tied to the collector of transistor 10 and its anode connected through the fixed resistance of potentiometer 22 to the common line 24 which returns to the negative terminal of battery 14. The arm of potentiometer 22 is coupled to the base of transistor 12, which has its emitter connected to common line 24. The collector of transistor 12 is tied through two serially connected resistors 26 and 28 to line 16. The junction of resistors 26 and 28 is connected to the base of transistor 10. One plate of capacitor 30 is coupled to input line 16, and the other plate is connected through resistor 32 to the junction of Zener diode 20 and potentiometer 22. Output lead 34 connects load 15 to the junction of the Zener diode 20 and the collector of transistor 10. Load 15 is returned to battery 14 by common line 24.

When switch 18 connects input line 16 to battery 14, an RC charging path exists through capacitor 30, resistor 32, and potentiometer 22 to the common line 24. The brief current, which exists during the time that capacitor 30 is charging, is sufficient to turn on transistor 12, thus permitting current to flow from input line 16 through resistors 26 and 28, and transistor 12 to common line 24. The current through resistors 26 and 28 biases transistor 10 on, permitting current to flow through its emitter-collector circuit, through Zener diode 20, and through potentiometer 22 to the common line 24. This current increases the bias on the base of transistor 12, driving it further toward saturation. The increased current flow through transistor 12 and resistors 26 and 28 increases the bias on the base of transistor 10, driving it further toward saturation. This regenerative action causes transistors 10 and 12 to reach saturation rapidly and to hold each other in saturation.

Capacitor 30 and resistor 32 function initially to turn on the switching circuit comprising transistors 10 and 12. When capacitor 30 has fully charged, current ceases to flow through resistor 32 to potentiometer 22 and common line 24. However, by that time, transistors 10 and 12 are in saturation. Therefore, power will be provided to load 15 from output line 34.

When battery 14 has become weakened by long use, its output voltage commences to drop. The voltage eventually reaches a point at which the voltage drop across Zener diode 20 will absorb most of the source voltage. As a result, insufficient current flows through potentiometer 22 to maintain transistor 12 in saturation. This reduces the current flow through resistors 26 and 28, causing transistor 10 to come out of saturation. Consequently, the voltage at the anode of Zener diode 20 is further reduced, and the current through potentiometer 22 is further decreased. This regenerative action will result in transistors 10 and 12 rapidly switching off, and all current flow from battery 14 terminates. Capacitor 30 which is charged to the same potential as battery 14, prevents current flow through its path. Load 15 is isolated from battery 14 by transistor 10. Thus, there is no path by which current can be drawn from battery 14, and so there is no possibility of any cell attaining a damaging reverse charge.

Once current flow from battery 14 has been terminated, capacitor 30 must be discharged before the circuit can operate, because capacitor charging current is utilized to turn on transistor 12. To discharge capacitor 30, switch 18 is thrown to its other position. Capacitor 30 discharges through resistor 19, potentiometer 22 and resistor 32. When switch 18 again connects input line 16 to battery 14, the transient current through resistor 32, while capacitor 30 is charging, turns on transistor 12, causing transistor 10 also to be turned on, and permitting an output current to flow. However, if battery 14 is still at its previous low-voltage level, once capacitor 30 has charged, insufficient current will flow through potentiometer 22 to the base of transistor 12 to bring transistor 12 to saturation, and so the circuit will again shut off. The brief current drawn from the battery will be insufficient to cause damage. Thus, the circuit provides sure battery protection.

Potentiometer 22 permits control of the lower voltage limit for the battery 14 before the switching circuit operates to terminate current flow. Potentiometer 22 can be adjusted to cause the circuit to switch off at a voltage which will insure the desired protection of both battery 14 and load 15. The regenerative action of transistors 10 and 12 results in very rapid switching once this low voltage condition is sensed. Consequently, the circuit operates positively and rapidly to protect battery 14 and load 15.

FIGURE 2 shows an embodiment of the invention which adds to the embodiment of FIGURE 1 a current sensor to terminate current from the battery when such a high current is flowing that it could damage the battery or the load circuitry. The low-voltage protection portion of the circuit is essentially identical to that of the first embodiment. Resistor 32 has been directly tied to the base of transistor 12 intsead of to the junction of Zener diode 20 and potentiometer 22. However, this is only a variation of the first embodiment, since the charging path for capacitor 30 still includes resistor 32 and potentiometer 22 and since this charging current still turns on transistor 12, causing the circuit to operate. Resistor 36 has been placed between the collector of transistor 10 and the cathode of Zener diode 20. Lead 34, which now is a control lead, is tied to the junction of resistor 36 and the collector of transistor 10.

A voltage divider formed by resistor 38 and the fixed resistance of potentiometer 40 is connected between control line 34 and common line 24. Control line 34 is also coupled to one side of resistor 42, the other side of which is connected to the anode of regulating diode 44. The cathode of diode 44 connects to one side of current sensing resistor 46 which has its other side tied to common line 24. Regulating diode 47 has its anode tied to the junction of resistor 38 and potentiometer 40 and its cathode connected to common line 24. NPN transistor 48 has its collector coupled to the cathode of Zener diode 20, its emitter tied to the arm of potentiometer 40, and its base connected to the anode of regulating diode 44.

Control line 34 is tied to the base of NPN power transistor 50, which has its collector coupled to line 16. Output line 51 connects load 15 between the emitter of transistor 50 and line 52, which ties it to the cathode of diode 44, and so connects it through current sensing resistor 46 to common line 24. Current sensing resistor 46 is of a very low value, in the order of one-half ohm, and so line 52, for all intents and purposes, is also a part of common line 24. Current returning from load 15 to battery 14 flows through common line 52, through current sensing resistor 46, and through common line 24 to battery 14. Therefore, the current through resistor 46, as determined by the voltage drop, is indicative of the current drawn by load 15.

The voltage sensing portion of the circuit shown in FIGURE 2 operates in the same manner as that previously described in conjunction with the circuit of FIGURE 1. Thus, when switch 18 initially connects input line 16 to battery 14, the transient current through resistor 32, which exists while capacitor 30 is charging, turns on the switching circuit, just as in the embodiment of FIGURE 1. As a consequence, control line 34 is energized, turning on power transistor 50 and permitting current to flow through load 15. When the voltage from battery 18 has decayed to such a level that there is insufficient current applied to the base of transistor 12 to retain it in its saturated state, the switching circuit turns off, just as in the first embodiment. This removes the voltage on control lead 34. Consequently, power transistor 50 is cut off, and current can no longer flow through load 15.

Within the current control portion of the circuit, regulating diodes 44 and 47 are matched and are selected to operate with transistor 48. With voltage available on control line 34, the voltage applied to the base of transistor 48 is determined by the forward voltage drop across diode 44 and by the voltage drop across current sensing resistor 46. Similarly, the voltage on the emitter of transistor 48 is determined by the forward voltage drop across diode 47 and by the setting of potentiometer 49. Consequently, fluxuations in the voltage on control line 34 do not affect the operation of transistor 48.

Diodes 44 and 47, transistor 48, and resistor 46 are selected, and potentiometer 40 is adjusted, so that with a normal, safe current flowing through load 15, transistor 48 is just cut off. The current drawn by load 15 returns to battery 14 through common line 52, resistor 46, and common line 24. If this current becomes excessive, for example, because of a short circuit in the load 15, the voltage drop across current-sensing resistor 46 increases. This increases the voltage differential between the base and the emitter of transistor 48, causing the transistor to turn on. Since transistor 48 has its emitter coupled through the arm of potentiometer 40 to common line 24 and its collector tied to the cathode of Zener diode 20, the conduction of transistor 48 causes the voltage at the cathode of Zener diode 20 to drop to a low value, determined by the setting of potentiometer 40. As a result, insufficient current flows through potentiometer 22 to maintain transistor 12 in its saturated state. This has the same effect as a sudden drop in the voltage of battery 14. Consequently, transistor 12 comes out of saturation and reduces the current flowing through resistors 26 and 28. This causes transistor 10 to be pulled out of saturation, thereby further reducing the current through potentiometer 22. Again the regenerative action causes the transistors 10 and 12 to shut off rapidly, thereby terminating the voltage on control lead 34. Consequently, power transistor 50 cuts off, and current can no longer flow through the load. Once again all current flow from battery 18 has been terminated. Transistors 10, 12 and 50 are cut off, preventing current flow through them, and capacitor 30 is charged to the same potential as the battery 14, and so no current can flow through its path.

Before the switching circuit can again be operated, capacitor 30 must be discharged by turning switch 18 to its other position to permit discharge through resistor 19, potentiometer 22 and resistor 32.

Potentiometer 22 permits control of the lower voltage limit which can be reached before the switching circuit operates. Similarly, potentiometer 40 determines the maximum current which can flow on line 52 before transistor 46 turns on, causing the switching circuit to terminate all current flow from battery 14. It will be appreciated that the regenerative action of transistors 10 and 12 results in very rapid switching, once either the low voltage condition or the high current condition has been sensed. Consequently, the circuit operates rapidly to prevent any damage to either the battery 14 or the load 15. Power transistor 50 permits larger load currents to be drawn than is possible with the embodiment of FIGURE 1, but, of course, if only small load currents are required, the load 15 can be connected directly to line 34 as in the first embodiment. Similarly, the power transistor 50 could be added to the embodiment of FIGURE 1, if required.

FIGURE 3 depicts another embodiment of the invention which is capable of protecting a battery from damage either due to a low-voltage condition or due to a high current drain. The embodiment of FIGURE 3 is identical to that of FIGURE 2, except that Zener diode 20 has been replaced by the parallel combination of resistor 54 and capacitor 56. Load 15 has been tied directly to output line 34, as in the embodiment of FIGURE 1, but, should a high load current be required, a power transistor can be utilized as in the embodiment of FIGURE 2. Resistor 54 is of a magnitude sufficient to keep the current through it and through potentiometer 22 at a level of about one milliampere when battery 14 is fully charged. The arm of potentiometer 22 is set to sense a very small voltage, just sufficient to keep transistor 12 in saturation, during the time battery 14 is charged to a safe level.

When switch 18 is closed to connect battery 14 to input line 16, the current through resistor 32, as capacitor 30 charges, turns on the switching circuit, as in the above embodiments. In that branch of the circuit comprising transistor 10, resistor 36, resistor 54, and potentiometer 22, most of the voltage is dropped across resistor 54, and also appears across capacitor 56. When the voltage from battery 14 drops, due to the battery discharging through long use, the current through potentiometer 22 to the base of transistor 12 becomes so low that transistor 12 is no longer held in saturation. As the current through it drops, the regenerative action of the circuit will cause transistors 10 and 12 to rapidly cut off, thereby isolating load 15 from battery 14.

In the event the current drawn by load 15 becomes excessive, the circuit operates in a manner similar to that of the embodiment of FIGURE 2. When this current becomes so high that the voltage drop across current sensing resistor 46 turns on transistor 48, the voltage at the junction of resistor 36 and resistor 54 suddenly drops. Capacitor 56 causes the voltage at the junction of resistor 54 and potentiometer 22 to drop by a like amount. Consequently, the current through potentiometer 22 to the base of transistor 12 is no longer sufficient to hold transistor 12 in saturation. Again, transistors 10 and 12 rapidly cut off due to the regenerative action. Thus, all current flow from battery 14 is terminated. Transistors 10 and 12 are cut off, and capacitor 30 is fully charged, and so no current path exists.

While the embodiment of FIGURE 3, utilizing resistor 54 and capacitor 56 in place of Zener diode 20, will permit satisfactory operation for some applications, the circuit will not have so sharp a cut-off point as with the first two embodiments, and its repeatability may be affected by temperature variations which are compensated by Zener diode 20 of the embodiment shown in FIGURE 2. However, this embodiment is suitable for many applications where these factors are not critical. Once transistor 12 starts to come out of saturation, the circuit will switch off rapidly, identically with the operation of the previous embodiments, because the switching is dependent on the regenerative action of transistors 10 and 12 and is not dependent upon any action of the Zener diode 20.

The circuits shown in the three embodiments provide rapid switching in the event of a low battery voltage or a high load current condition. Once the circuits operate, all current flow from the battery is terminated, ensuring protection of the battery from a low voltage condition which could damage one of its cells and from a high current condition which could damage the battery or its load. The circuits have been shown controlling the positive terminal of the battery, but of course they can also be utilized for equipment operated off a negative potential, simply by interchanging the conductivity types of the transistors and by changing the polarity of the diodes.

While the present invention has been discussed with respect to preferred embodiments, it is apparent that various modifications may be made therein within the scope of the invention, and it is desired, therefore, that only such limitations be placed on the invention as are imposed by the prior art and set forth in the appended claims.

What is claimed is:

1. A battery protection circuit comprising, in combination.
    (a) input means adapted to connect said circuit to a battery;
    (b) output means adapted to connect said circuit to a load;
    (c) switching means, connected between said input means and said output means, for permitting current to flow between said input means and said output means when in a first condition, and for terminating all current flow from said input means when in a second condition;
    (d) a current path coupled to said input means and to said switching means, said current path causing said switching means to assume its first condition in response to the initial application of battery voltage across said input means and being inoperative thereafter;
    (e) a voltage sensing means, connected in said switching means, for causing said switching means to assume its second condition when the voltage across said input means is below a predetermined level; and
    (f) a current sensing means connected with said switching means for causing said switching means to assume its second condition when the current flowing through said output means is above a predetermined value.

2. A battery protection circuit as claimed in claim 1 wherein said switching means comprises a first transistor of one conductivity type and a second transistor of opposite conductivity type, said first transistor having its emitter-collector circuit coupled with said voltage sensing means across said input means, said second transistor having its emitter-collector circuit coupled with a biasing means across said input means, the base of said first transistor connected to said biasing means, and the base of said second transistor connected to said voltage sensing means.

3. A battery protection circuit as claimed in claim 2 wherein said switching means further comprises a third transistor, said third transistor being of said opposite conductivity type and having its emitter-collector circuit connected between said input means and said output means and having its base connected to said emitter-collector circuit of said first transistor.

4. A battery protection circuit as claimed in claim 2 wherein said current path comprises a series resistance-capacitance circuit connected between said input means and the base of said second transistor.

5. A battery protection circuit as claimed in claim 2 wherein said voltage sensing means comprises the series combination of a Zener diode and a resistance.

6. A battery protection circuit as claimed in claim 2 wherein said voltage sensing means comprises a series combination of electrical resistors, and a capacitor shunting a part of said series combination.

7. A battery protection circuit comprising, in combination:
    (a) a pair of input conductors;
    (b) a first transistor of one conductivity type and having an emitter, a collector, and a base;
    (c) a second transistor of opposite conductivity type and having an emitter, a collector, and a base;
    (d) voltage sensing means;
    (e) biasing means;
    (f) said first transistor having its emitter-collector circuit connected with said voltage sensing means across said pair of input conductors;
    (g) said second transistor having its emitter-collector circuit connected with said biasing means across said pair of input conductors;
    (h) said base of said first transistor connected to said biasing means;
    (i) said base of said second transistor connected to said voltage sensing means;
    (j) a current path connected between one of said pair of input conductors and the combination of said first and second transistors;
    (k) a pair of output conductors connected across said voltage sensing means;
    (l) said voltage sensing means causing current flow through the emitter-collector circuit of said second transistor to be restricted when the voltage across said input conductors is below a preset level; and
    (m) a third transistor of said opposite conductivity type having an emitter, a collector, and a base, and having its emitter-collector circuit connected between one of said pair of input conductors and one of said pair of output conductors and having its base connected to said voltage sensing means.

8. A battery protection circuit as claimed in claim 7 wherein said voltage sensing means comprises a series combination of a Zener diode and a resistance.

9. A battery protection circuit as claimed in claim 7 wherein said voltage sensing means comprises a series combination of resistors, and a capacitor shunting a part of said series combination.

10. A battery protection circuit as claimed in claim 7 further comprising a current sensing means in circuit with said pair of output conductors, said current sensing means restricting the voltage applied to said base of said second transistor when the current through said pair of output conductors is above a preset value.

References Cited

UNITED STATES PATENTS

| | | | |
|---|---|---|---|
| 3,078,410 | 2/1963 | Thomas | 323—22 |
| 3,109,980 | 11/1963 | Wiley | 323—22 |
| 3,204,175 | 8/1965 | Kuriger | 323—22 |
| 3,218,542 | 11/1965 | Taylor | 323—22 |

JOHN F. COUCH, *Primary Examiner.*

STANLEY WEINBERG, *Assistant Examiner.*